(12) United States Patent
Hoerner et al.

(10) Patent No.: US 9,021,817 B2
(45) Date of Patent: May 5, 2015

(54) MONOLITHIC CONSTRUCTION COMPRESSED AIR/GAS DRYER SYSTEM WITH FILTRATION

(75) Inventors: Allan Hoerner, Alden, NY (US); John A. Carlin, Buffalo, NY (US)

(73) Assignee: Parker-Hannifin Corporation, Lancaster, NY (US)

( * ) Notice: Subject to any disclaimer, the term of this patent is extended or adjusted under 35 U.S.C. 154(b) by 160 days.

(21) Appl. No.: 13/541,095

(22) Filed: Jul. 3, 2012

(65) Prior Publication Data

US 2014/0007606 A1 Jan. 9, 2014

(51) Int. Cl.
*F25D 3/12* (2006.01)
*B01D 53/26* (2006.01)
*B23K 31/02* (2006.01)

(52) U.S. Cl.
CPC .............. *B01D 53/265* (2013.01); *B23K 31/02* (2013.01)

(58) Field of Classification Search
CPC ...... F25D 21/14; F24F 13/222; F24F 1/0007; F24F 3/153; F24F 3/1405; F24F 11/0012; F25B 9/006; F25B 40/00; F25B 39/02; F25B 5/02; A23G 9/225
USPC ............... 62/291, 524, 176.5, 502; 34/62, 76
See application file for complete search history.

(56) References Cited

U.S. PATENT DOCUMENTS

| | | | | |
|---|---|---|---|---|
| 4,154,355 | A | | 5/1979 | Shackelford |
| 4,738,120 | A | * | 4/1988 | Lin ................................ 62/272 |
| 4,892,569 | A | * | 1/1990 | Kojima ............................ 96/113 |
| 5,002,593 | A | * | 3/1991 | Ichishita et al. ................ 96/137 |
| 5,286,283 | A | * | 2/1994 | Goodell ........................... 96/113 |
| 5,427,609 | A | * | 6/1995 | Zoglman et al. ................... 95/98 |
| 5,680,711 | A | * | 10/1997 | Moratalla .......................... 34/77 |
| 5,794,453 | A | | 8/1998 | Barnwell |
| 6,470,693 | B1 | | 10/2002 | Dickey |
| 6,691,428 | B1 | * | 2/2004 | Zarif ................................. 34/62 |
| 7,121,102 | B2 | | 10/2006 | Fijas |
| 7,343,755 | B2 | | 3/2008 | Bogart |
| 7,481,869 | B2 | * | 1/2009 | Vanderhoof et al. ................ 96/4 |
| 7,625,437 | B2 | * | 12/2009 | Heer .............................. 96/134 |
| 2002/0116933 | A1 | | 8/2002 | Chu |
| 2005/0066538 | A1 | * | 3/2005 | Goldberg et al. ............... 34/218 |
| 2005/0235614 | A1 | * | 10/2005 | Smith ............................. 55/309 |
| 2006/0179676 | A1 | * | 8/2006 | Goldberg et al. ................. 34/77 |
| 2009/0007787 | A1 | * | 1/2009 | Wright et al. ....................... 96/4 |
| 2012/0023985 | A1 | | 2/2012 | Dahl |
| 2013/0055735 | A1 | | 3/2013 | DeMonte |

OTHER PUBLICATIONS

Office Action dated Aug. 29, 2013 for U.S. Appl. No. 13/102,929.

* cited by examiner

*Primary Examiner* — Mohammad M Ali
(74) *Attorney, Agent, or Firm* — Christopher Hunter

(57) ABSTRACT

A monolithic compressed-gas dryer including in series: an inlet chamber, a precooler/reheater chamber, an evaporator chamber, and a sump chamber. The chambers are welded together to form columns where at least one column has a filtration chamber. Further provided is a gas outlet. The system creates a first and second set of heat transfer passages where refrigerant passes through the second set in a heat exchange relationship in a direction perpendicular to incoming gas passing in the first set. The filtration chamber conducts chilled gas from the first set to a third set of heat transfer passages. The third set extends through the precooler/reheater in heat exchange relationship with the first set. Chilled gas passes in heat exchange relationship in a direction perpendicular to the incoming gas so that the incoming gas chilled in the evaporator exchanges heat with the incoming gas in the precooler/reheater.

29 Claims, 7 Drawing Sheets

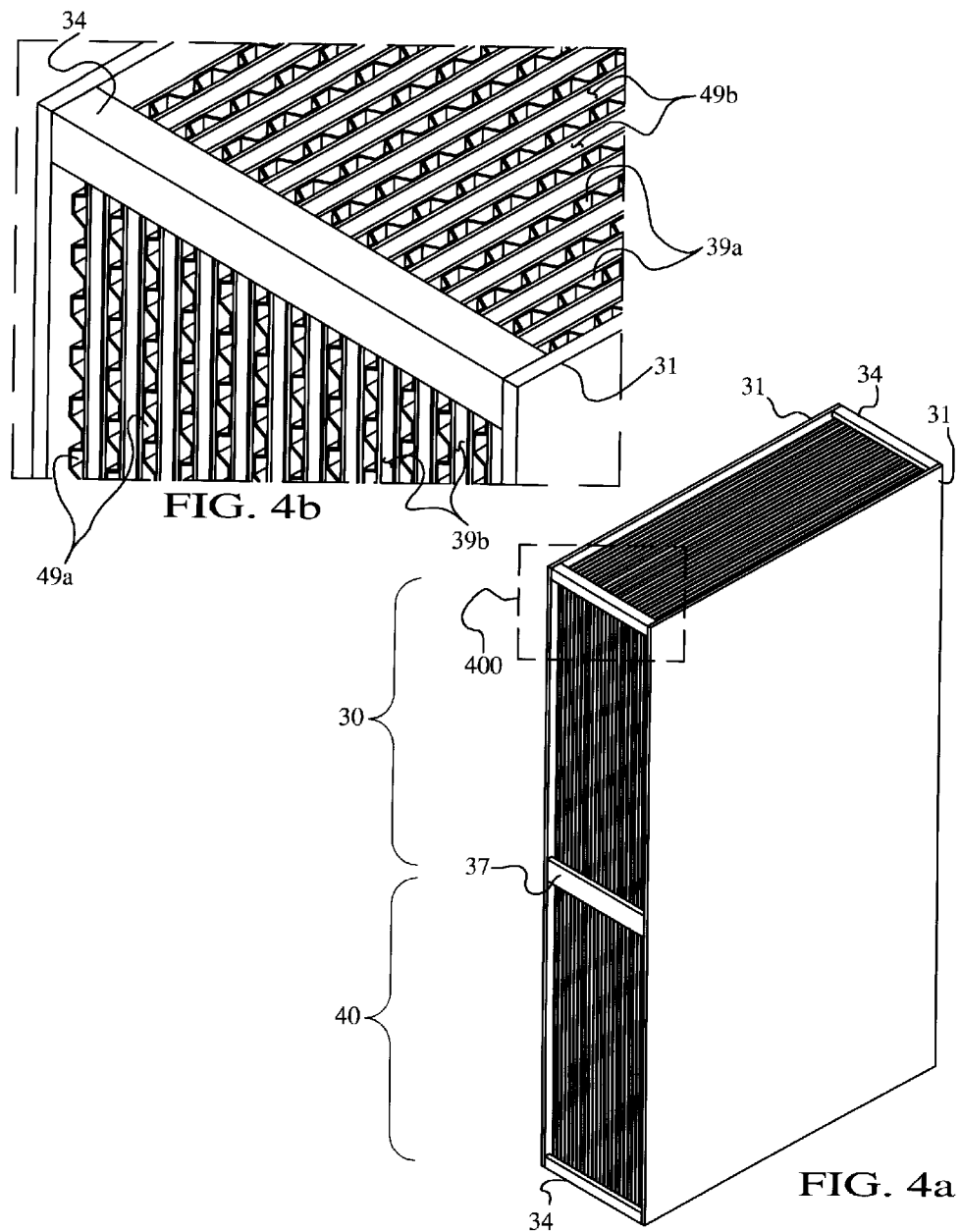

MONOLITHIC CONSTRUCTION COMPRESSED AIR/GAS DRYER SYSTEM WITH FILTRATION

BACKGROUND OF THE INVENTION

1. Field of the Invention

This patent application relates to a compressed air/gas dryer system for generating clean, dry air for use in industrial processes. More specifically this patent application relates to a refrigerant compressed air/gas dryer system comprising a singular monolithic construction and a replaceable filter.

2. Background

Atmospheric air is contaminated with varying concentrations of hydrocarbons, solid particles and water vapor. When compressed to a working pressure of 100 pound-force per square inch gauge (PSIG), the concentration of these contaminants is increased by a factor of eight to one. If these contaminants are not removed prior to entering a process distribution system they will damage air operated equipment, slow down or stop production, corrode the inside of pipes, spoil product, ruin processes, and drive up energy costs.

Moisture is a serious problem in compressed air systems. Since atmospheric air always contains some amount of moisture, measured in terms of relative humidity. Relative humidity is the ratio of moisture in the air compared to the capacity of moisture that volume of air is capable of holding at a specified temperature. When air is compressed, friction causes the actual air temperature to rise, greatly increasing its ability to hold moisture. At 100 PSIG the quantity of moisture commonly held in eight cubic feet of air is reduced in an area ⅛ its original size. The result of compression is hot, wet, dirty air.

A good general rule is that for every twenty degrees Fahrenheit (20° F.) the temperature of air decreases, its ability to hold moisture is reduced by 50%. As air passes through a plant piping system, the ambient conditions cause the compressed air to cool, causing the formation of liquid water. This water, coupled with particulate matter and oil/lubricant carry-over will cause numerous problems. The water will wash away lubricants from tools and machinery, spoil paint applications, rust the general system, and, if exposed to unfavorable ambient temperatures, freeze.

Particulate matter consists of atmospheric particles that are drawn into a plant piping system through the air compressor intake. Some air system components, along with scale build-up in piping, may introduce additional particulate matter. Particulates traveling through the air system will cause pressure drop to increase, valves and orifices to clog, and product to be spoiled. Particulate matter will clog orifices and valves, damage gear driven equipment, increase system pressure drop and contaminate product.

Airborne hydrocarbons, compressor oils and lubricants are harmful to all downstream equipment and processes. Today's high performance compressor lubricants can cause additional problems, and need to be removed before they cause irreversible damage. They will cause valve and gasket materials to fail, and wreak havoc on processing equipment. Residual oils and lubricants will cause valve wear, spoiled product and system contamination.

Therefore, it is essential to treat process air before it can do any damage to a process system. By drying and filtering compressed air, operation efficiency can be maximized, and equipment productivity and longevity can be greatly increased.

Presently, refrigerated compressed air/gas dryer systems utilize some basic components. For example, there is usually a heat exchange unit used to pre-cool air entering the dryer system and to reheat dry air before the air leaves the dryer. Various systems also use an evaporator for circulating refrigerant to promote condensation of water vapor followed by a means to drain-off the resultant condensation. Systems are further equipped with a filter to clean the compressed air/gas before the air/gas enters the dryer system and/or as the air/gas leaves the dryer system. Additionally, some systems utilize a filter as an intermediate stage component; such as after the evaporator and before the reheater. To date, there are no dryer systems contained within a single housing that efficiently allows the passage of compressed air/gas to flow through the system and exit both dry and filtered.

U.S. Pat. No. 5,794,453 discloses an apparatus for removing condensate from a gas. The system has a chiller to cool the gas followed by a separator to remove the condensed liquid. The dried gas is then sent through a reheater before exiting the apparatus. While this apparatus dries and reheats the gas, there are significant drawbacks to this design. First, there is no filtration of the gas to remove particulates or to further condense any remaining water vapor in the gas following chilling. Secondly, the device is inefficient as the hot incoming air is cooled only through the chiller, thus requiring more energy to run and a greater amount of refrigerant to cool the gas.

U.S. Pat. No. 6,470,693 describes a gas compressor refrigeration system. The system has a chiller to cool the gas followed by a separator to remove the condensed liquid. The dried gas is then sent through a reheater before exiting the apparatus. A closed-loop refrigerant system which supplies heat to the reheater and is then recharged to cool the gas in the chiller. While this apparatus dries and reheats the gas, there are significant drawbacks to this design. First, there is no filtration of the gas to remove particulates or to further condense any remaining water vapor in the gas following chilling. Secondly, the device is inefficient as the hot incoming air is cooled only through the chiller, thus requiring more energy to run and a greater amount of refrigerant to cool the gas.

U.S. Pat. No. 7,343,755 presents a gas drying system having a recuperator, a moisture separator, and a refrigerated section housed in a single unit. The recuperator has a pair of fluid flow paths in thermal communication such that incoming hot air is cooled by, and in turn warms, cooled air exiting the system. The incoming air is further chilled in the refrigerated section to cause water in the air to condense into liquid water. The liquid water is then separated from the gas in the separator section. While this apparatus dries and reheats the gas, there is no filtration of the gas to remove particulates or to further condense any remaining water vapor in the gas following chilling.

Importantly none of the example provided above, even combined, construct in a single, compact housing, all the necessary elements to dry and clean compressed air/gas, namely to precool incoming gas, to chill the gas to 33° F., to drain off resulting condensation and to coalesce any remaining water molecules, to remove particulates in the gas, to sense the liquid level (of coalesced condensate) and drain off as necessary, and to reheat exiting gas. Further, none of the above examples employ filtration, and more specifically, filtration using a replaceable filter.

Thus, there is clearly a long-felt need for a free-standing, cost effective, refrigerated compressed air/gas dryer system that dries and filters compressed air/gas in a single pressurized housing where the housing further comprises a replaceable coalescing filter; eliminating the need for bulky interconnecting means between subcomponents. Ideally, a refrigerated compressed air/gas dryer system that dries and filters compressed air/gas in a single pressurized housing is compatible with a variety of existing dryer systems.

It should be understood that there are other conventional components that, when combined with the refrigerant compressed air/gas dryer system of the present disclosure, fully constitute a finished dryer which is ready for use. Such additional conventional components include a condensing unit (refrigerant compressor, condenser that is either air or water cooled, receiver, accumulator, pressure switches), drain solenoids and valves, cabinetry, controls and wiring, etc.

SUMMARY OF THE INVENTION

It is accordingly an object of the present disclosure is to provide a compressed air/gas dryer system which is comprised of an air inlet compartment, a precooler/reheater compartment, and evaporator compartment and a sump compartment housed in a single pressurized housing.

A further object of the present disclosure is to provide a compressed air/gas dryer system which is housed in a single pressurized housing and which further comprises an intermediate stage replaceable coalescing filter.

Still another object of the present disclosure is to provide a compressed air/gas dryer system where there is a unidirectional air/gas flow circuit through the housing and a unidirectional refrigerant flow circuit within the evaporator compartment.

Yet another object of the present disclosure is to provide a compressed air/gas dryer system which is comprised of an air inlet compartment, a precooler/reheater compartment, and evaporator compartment and a sump compartment housed in a single pressurized housing where each compartment welded sequentially to produce a fully assembled unit.

Another object of the present disclosure is to provide a compressed air/gas dryer system which has 'layered' horizontal compartments, when assembled, comprise vertical column chambers for adding filters.

The above and other objects are accomplished in accordance with the present disclosure which comprises an air/gas dryer system housed in a single pressurized unit having a plurality of horizontal compartments and at least one vertical compartment in fluid communication with at least one of the horizontal compartments where the vertical compartment contains a replaceable air filter. The system has an inlet chamber with an air inlet port for admission of air/gas into the dryer system. Inlet air passes into a precooler/reheater chamber which cools the air from the inlet chamber while, without allowing communication between incoming and outgoing air, simultaneously warms outgoing air which is directed out of the system through an air outlet port. Precooled air then passes into an evaporator chamber having inlet and outlet ports for circulating refrigerant/coolant within a refrigerant flow circuit. The air is further cooled, by way of the refrigerant, until the air temperature nears 33° F. Cooling the air causes the water vapor within the air to condense into liquid water and collect in the sump chamber where it can then be drained out of the system. The air then passes into a filter compartment which is a dedicated vertical compartment. The filter compartment contains a coalescing filter which further dries the air and removes any particles. Liquid water captured by the filter element (water molecules coalesce into droplets and travel down the filter) is removed via a filter drain port located at the base of the filter seat within the filter column. The coalescing filter is replaceable and is accessed by an entry port on the top of the dryer housing. The system further comprises a dew point sensor port and a condensation level sensor port. The air/gas dryer system further has a mechanical mounting means located next to the air inlet & air outlet ports and on the bottom side of the bottom plate.

BRIEF DESCRIPTION OF THE DRAWINGS

The present disclosure and the manner in which it may be practiced is further illustrated with reference to the accompanying drawings wherein:

FIG. 4a is a perspective view of one embodiment of a precooler/reheater and evaporator heat exchanger unit of the present disclosure.

FIG. 4b is an expanded view of a precooler/reheater and evaporator heat exchanger unit of the present disclosure taken generally from boxed region 400 in FIG. 4a.

DESCRIPTION OF SPECIFIC EMBODIMENTS

Figure 1:
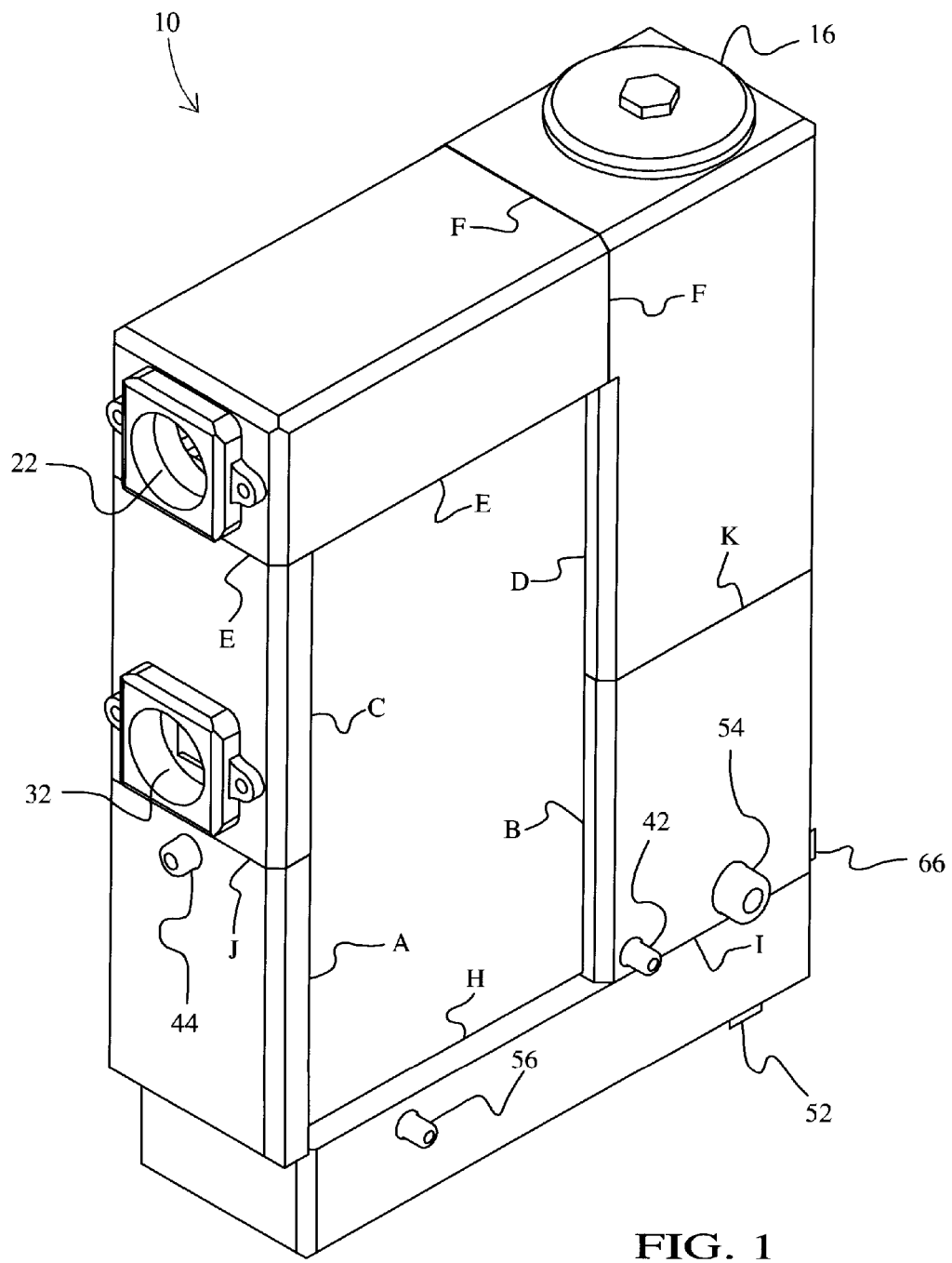
FIG. 1 is a perspective view of one embodiment of a compressed air/gas dryer system of the present disclosure.

At the outset, it should be clearly understood that reference numerals are intended to identify the information found in the block diagrams in the several drawing figures, as may be further described or explained by the entire written specification of which this detailed description is an integral part. The drawings are intended to be read together with the specification and are to be construed as a portion of the entire "written description" of this disclosure as required by 35 U.S.C. §112.

Refrigerated compressed air/gas dryer systems utilize some basic components to produce clean, dry and compressed air. Typically a dryer system, will intake at the inlet wet, hot and dirty compressed air/gas which is at approximately 100 PSI and at 100° F., with a relative humidity of 100%. The precooler cools the air temperature down to about 70° F. and the evaporator further cools air temperature down to the desired dew point target of approximately 33/34° F. The air leaves the evaporator and the liquid water condensate falls out of the air. The cold dryer air/gas is filtered and further dried by the coalescing filter before the air enters the reheater section where it is warmed (from the incoming hot air) to about 80° F. Fahrenheit. As the air exits the dryer system it is clean, dry air ready for use as compressed air/gas for industry. For example, a heat exchange unit is typically used to pre-cool air entering the dryer system and to reheat dry air before the air leaves the dryer. Various systems also use an evaporator for circulating refrigerant to promote condensation of water vapor followed by a means to drain-off the resultant condensation. Systems are further equipped with a filter to clean the compressed air/gas before the air/gas enters the dryer system and/or as the air/gas leaves the dryer system. Additionally, some systems utilize a filter as an intermediate stage component; such as after the evaporator and before the reheater. However, there are no dryer systems contained within a single pressurized housing that efficiently allows the passage of compressed air/gas to flow through the system and exit both dry and filtered. The preferred embodiment of the present disclosure provides for a monolithic constructed pressurized vessel apparatus, with replaceable filtration, which allows a flow of both refrigerant/coolant and compressed air/gas to pass through the single structure system to achieve clean, dry and compressed air with greater economy and reduced cost of manufacturing. This increased efficiency further reduces the physical size of the pressurized system, as well as the cabinetry in which the system is installed.

Adverting now to the drawings, with reference to FIG. 1, a preferred embodiment of the present disclosure of a compressed air/gas dryer system is indicated generally by numeral 10. In a preferred embodiment, the singular pressurized housing is comprised of a single monolithic unit having a plurality of horizontal and vertical compartments (subcomponents) with at least one vertical compartment in fluid communication with at least one horizontal compartment, where the vertical compartment contains a replaceable air filter. Preferably, the housing is of an aluminum cast and/or aluminum extrusion construction comprising a number of functional units that are welded within the housing during fabrication. However, any suitable material can be used to form the housing including, but not limited to, another metal, an alloy, or a suitable polymeric material. The outer surface of the housing has a number of port openings. The top surface plate of the housing is equipped with filter access cap 16 which allows quick and easy access to a replaceable filter seated within the housing. Along a side surface plate of the housing is air inlet port 22 for introducing hot, wet, dirty air into the dryer system, air outlet port 32 for releasing warm, dry, clean air, refrigerant/coolant inlet port 42 for introducing a charged refrigerant, refrigerant/coolant outlet port 44 for removing spent refrigerant, sump area drain port 52 for clearing condensate, and filter chamber drain port 66 for clearing condensate. The housing further has a dew point sensor port 56 and condensation level sensor port 54 for insertion of the respective sensor. A weld sequence is indicated by letters A through K where the seam between each of the subcomponents is welded in alphabetical order. On the bottom surface plate are mounting means (not shown) for mounting the dryer system 10 in a cabinet structure (not shown).

Figure 2:
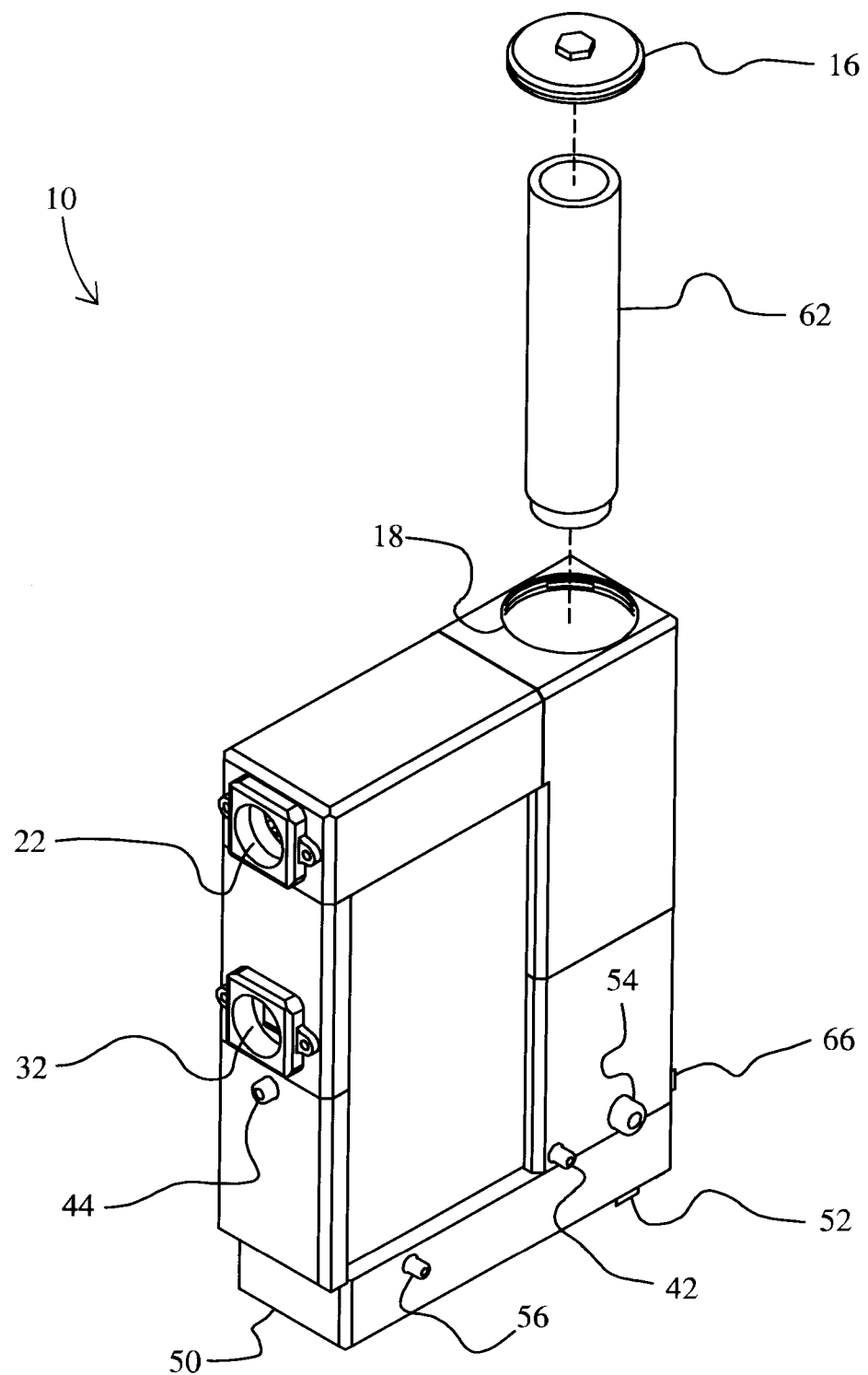
FIG. 2 is a perspective view of one embodiment of a compressed air/gas dryer system of the present disclosure showing the removal of the replaceable filter.

FIG. 2 shows the compressed air/gas dryer system of a preferred embodiment of the present disclosure with filter access cap 16 removed. When the cap is removed, filter access hole 18 is exposed allowing one to quickly and easily replace filter 62. In a preferred embodiment, filter access cap 16 is equipped with male threads and/or an o-ring seal typically made out of rubber or a synthetic polymer where the male threads correspond with female threads within access hole 18 to secure cap 16 with an air tight seal.

Figure 3A:
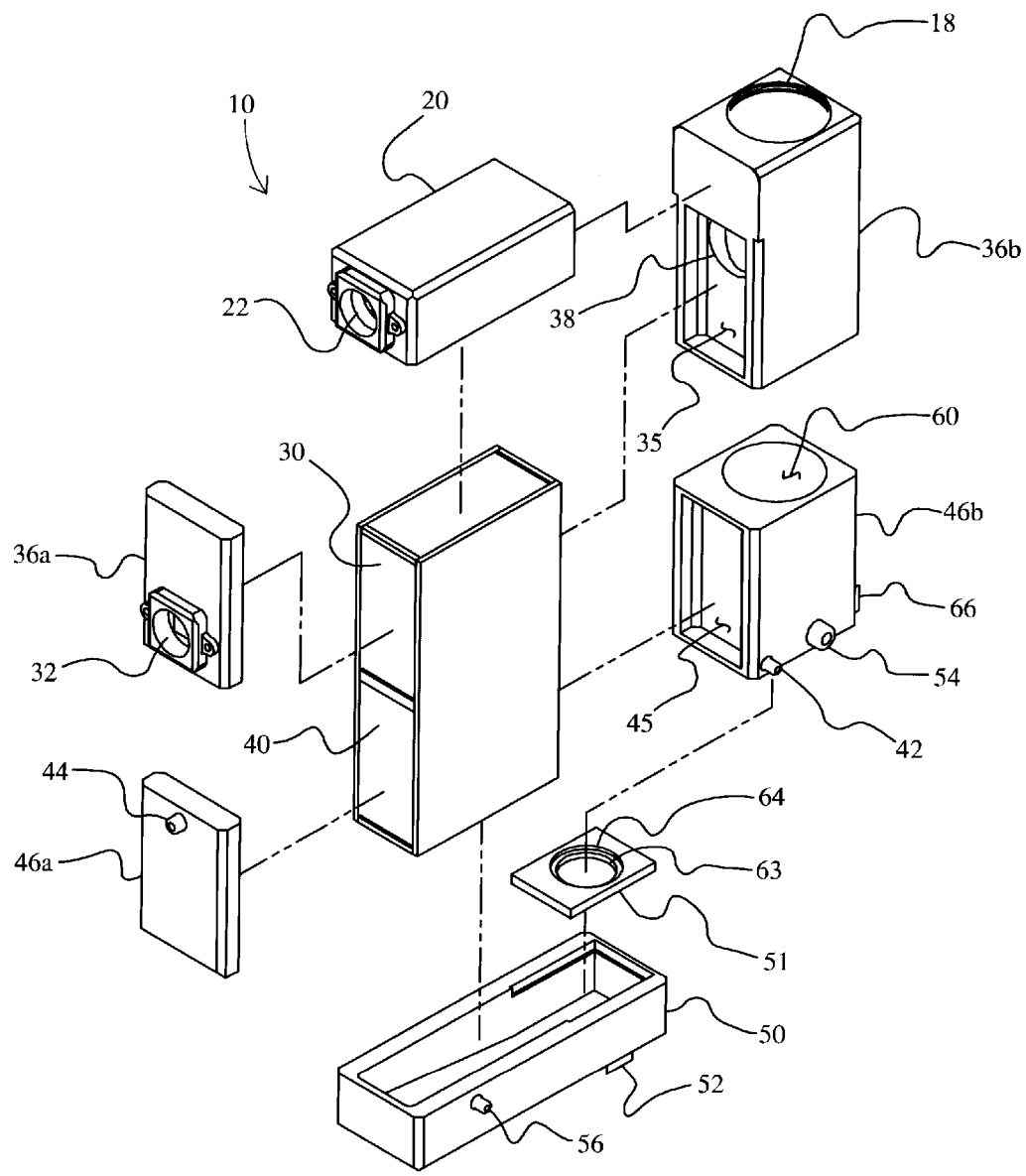
FIG. 3a is an exploded perspective view of one embodiment of a compressed air/gas dryer system of the present disclosure.

FIG. 3a is an exploded detailed perspective illustration of one embodiment of a compressed air/gas dryer system of the present disclosure. In this embodiment, dryer system 10 has four horizontal chambers; inlet chamber 20, precooler/reheater heat exchanger chamber 30, evaporator heat exchanger chamber 40, and sump chamber 50, as well as vertical filter column 60 for receiving a filter. Inlet chamber 20 is equipped with air inlet port 22 for introduction of hot, wet, and contaminated air into the compressed air/gas dryer system of the present disclosure. Air injected into the dryer through inlet port 22 passes from inlet chamber 20 into the precooler section of precooler/reheater heat exchanger chamber 30.

Figure 6:
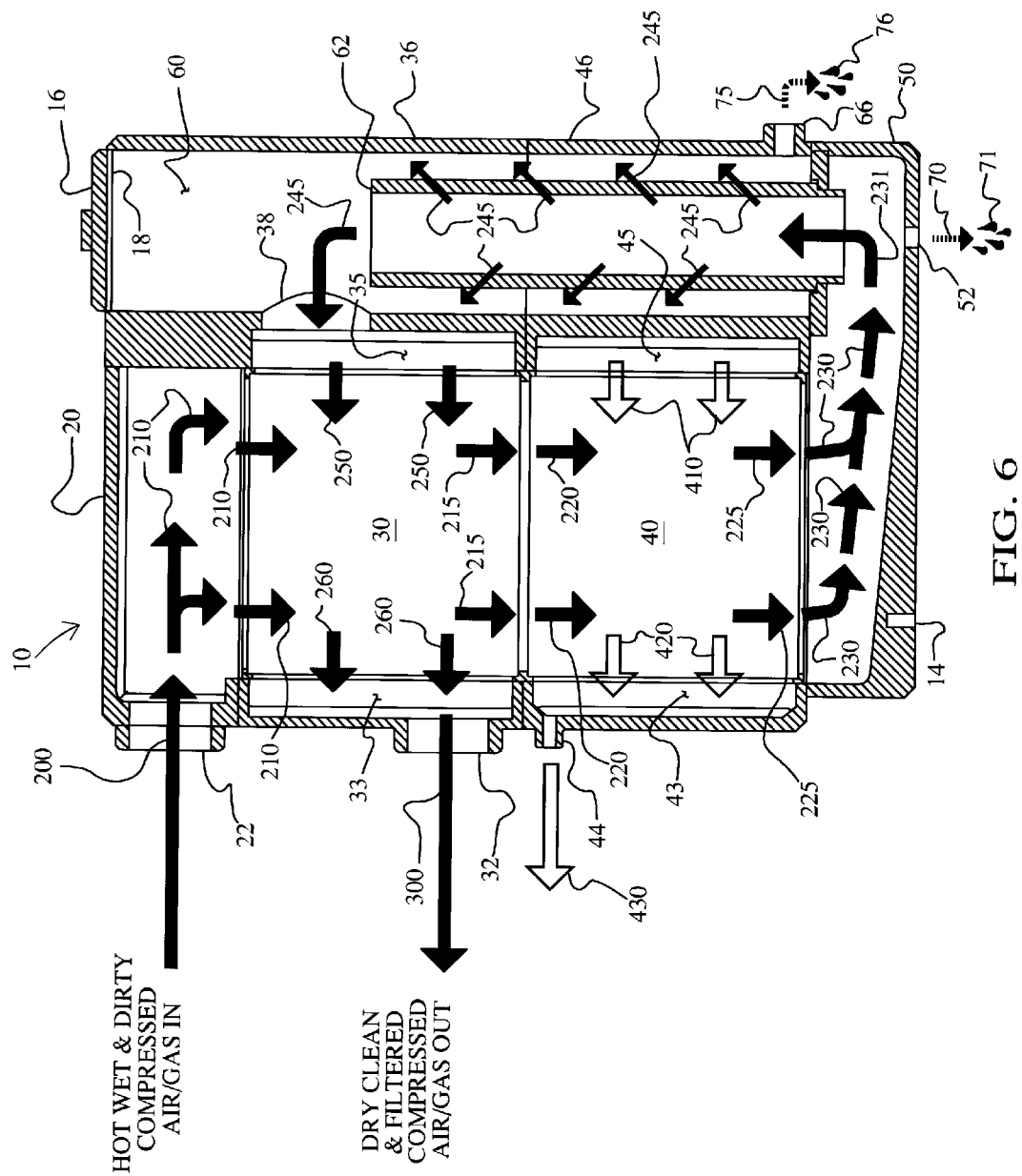
FIG. 6 is a flow schematic illustrating a representative example of air flow through one embodiment of a compressed air/gas drying system of the present disclosure.

The precooler/reheater heat exchanger unit is comprised of precooler/reheater chamber 30, after precooler/reheater cavity 33 (as shown in FIG. 6) formed by joining precooler/reheater after subcomponent 36a with precooler/reheater heat exchanger chamber 30, and precooler/reheater before cavity 35 formed by joining precooler/reheater before subcomponent 36b with precooler/reheater heat exchanger chamber 30. Cavities 33 and 35 allow for even distribution of gas flows through horizontal reheater section of the precooler/reheater heat exchanger chamber 30. Precooler/reheater after subcomponent 36a is equipped with air outlet port 32 for release of clean, cool, and dry air from the compressed air/gas dryer system of the present disclosure. Precooler/reheater before subcomponent 36b is equipped with filter access hole 18 which is used to insert or remove a replaceable filter. Filter access hole 18 is in fluid communication with precooler/reheater before subcomponent 36b and evaporator before subcomponent 46b to form vertical filter column 60 which houses a replaceable filter (not shown). Precooler/reheater before subcomponent 36b is further equipped with pass-through hole 38 which directs air from vertical filter column 60 into the reheater section of precooler/reheater heat exchanger chamber 30.

In like manner, the evaporator heat exchanger unit is comprised of evaporator heat exchanger chamber 40, evaporator after cavity 43 (as shown in FIG. 6) formed by joining evaporator after subcomponent 46a with evaporator heat exchanger chamber 40, and evaporator before cavity 45 formed by joining evaporator before subcomponent 46b with evaporator heat exchanger chamber 40. Evaporator after subcomponent 46a is equipped with refrigerant/coolant outlet port 44 in fluid connectivity with evaporator after cavity 43. Evaporator before subcomponent 46b is equipped with refrigerant/coolant inlet port 42 in fluid connectivity with evaporator before cavity 45. During use, charged refrigerant/coolant is introduced into evaporator before cavity 45 through refrigerant/coolant inlet port 42 and flows from evaporator before cavity 45 through the horizontal evaporator section of evaporator heat exchanger chamber 40 where it cools air passing through the vertical section of evaporator heat exchanger chamber 40. The spent refrigerant/coolant then passes into evaporator after cavity 43 before exiting the system through refrigerant/coolant outlet port 44. In this regard, a continuous stream of refrigerant/coolant is supplied to the evaporator heat exchanger unit. Evaporator before subcomponent 46b is further equipped with condensation level sensor port 54 and filter chamber drain port 66, both of which are in fluid communication with vertical filter column 60. During use, any moisture that condenses within vertical column 60 will accumulate at the bottom of evaporator before subcomponent 46b. A condensation sensor (not shown) is inserted within condensation level sensor port 54 and is used to monitor condensation level. In a preferred embodiment, once a sufficient amount of condensate is detected by the condensation sensor, the filter chamber drain port 66 is opened thereby allowing removal of the collected condensate.

Sump chamber 50 is equipped with a filter mounting plate 51, sump area drain port 52 and dew point sensor port 56. Filter mounting plate 51 has coalescing filter seat 64 with attachment means 63. Attachment means 63 can be any of threaded or bayonet style connections and is designed to coordinate with a replacement filter inserted into vertical column 60. In a preferred embodiment, filter 62 (as shown in FIG. 2) is seated within coalescing filter seat 64 using a threaded connection or a threaded connection with an O-ring seal made from rubber or another suitable material such as synthetic polymer. This arrangement allows for the filter to be quickly and easily changed without necessitating the complete replacement of the dryer system. A dew point sensor is inserted into dew point sensor port 56 to measure the 'air dryness,' e.g. dew point. Any amount of condensate collected in sump chamber 50 is evacuated by opening sump area drain port 52.

Figure 3B:
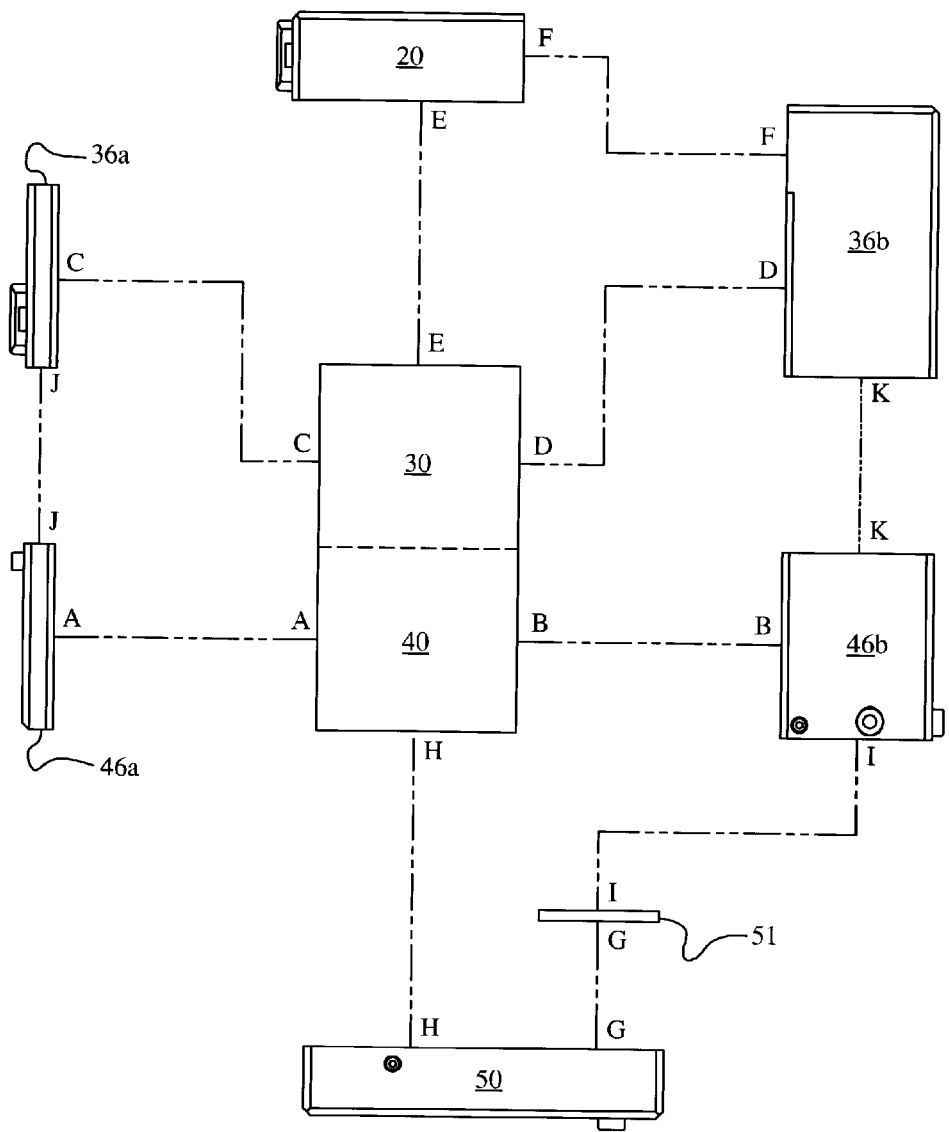
FIG. 3b is an exploded side planer view of one embodiment of a compressed air/gas dryer system of the present disclosure.

FIG. 3b illustrates a preferred assembly sequence of the subcomponents of the single monolithic construction pressurized housing shown in FIG. 3a. Importantly, the compressed air/gas dryer system of the present disclosure must be completely pressure-tight, and in particular, evaporator heat exchanger chamber 40 must be especially pressure-tight to prevent leaking of refrigerant/coolant into the system. Because the pressure-tight seal around evaporator heat exchanger chamber 40 must be ensured, the preferred sequence in welding the subcomponents together is as follows:
  a. Seam 'A' between evaporator heat exchanger chamber 40 and evaporator after subcomponent 46a;
  b. Seam 'B' between evaporator heat exchanger chamber 40 and evaporator before component 46b;
  c. Seam 'C' between precooler/reheater heat exchanger chamber 30 and precooler/reheater after subcomponent 36a;
  d. Seam 'D' between precooler/reheater heat exchanger chamber 30 and precooler/reheater before subcomponent 36a;
  e. The remaining seams 'E', 'F', 'G', 'H', T, T and 'K' are sealed in any sequence, but in a preferred embodiment, are sealed in alphabetical order.

Each of seams 'A' and 'B' are welded on their top, sides and bottom surfaces. Once both subcomponents 46a and 46b are fully welded, the horizontal section of evaporator heat exchanger chamber 40 is pressure tested for tightness before proceeding with the assembly. Pressure testing is accomplished by sealing off the refrigerant/coolant outlet port 44 and pressurizing with, for example an inert gas such as nitrogen, via refrigerant/coolant inlet port 42. Seams 'C' and 'D' are only welded on their top and side surfaces. The horizontal section of precooler/reheater heat exchanger chamber 30 becomes pressure/air-tight when seams 'J' and 'K' are sealed. It should be noted that there is a minor leak of clean dry air between the vertical filter chamber 60 through the inner seam surface of seam 'K' into the before distribution cavity 35. The minor leak is acceptable because clean dry air will be in the precooler/reheater before cavity 35 on its normal flow through the system. Once all of the seams have been sealed, the system is ready for a final pressure test.

In a preferred embodiment, the pressure/airtight seal is provided through use of a weld. Welds ensure airtight seals at the junctions between chambers and column. However, it is envisioned that any suitable means can be employed to ensure a proper seal, such as the use of solder or braze.

FIG. 4a shows an embodiment of the precooler/reheater heat exchanger chamber 30 and evaporator heat exchanger chamber 40 constructed as a single, combined unit. In this particular embodiment, the combined unit is comprised of a multiplicity of alternating horizontal and vertical channel arrays sandwiched between outer plates 31 with a width defined by the length of corner supports 34 and mid support 37. Mid support 37 further delineates the boundary between precooler/reheater heat exchanger chamber 30 and evaporator heat exchanger chamber 40. Mid support 37 provides a welding surface for sealing each heat exchanger chamber 30 and 40.

FIG. 4b shows an expanded view of vertical and horizontal channel arrays which together form precooler/reheater heat exchanger chamber 30 and evaporator heat exchanger chamber 40 taken generally from boxed region 400 in FIG. 4a. The individual vertical and horizontal channel sheets which form the arrays are completely isolated from one another when the combined unit is installed into the assembly according to the teaching of the present disclosure. In a preferred embodiment, the vertical and horizontal channel arrays are formed from sheets of aluminum which are pressed in a press and die to result in a corrugated pattern. The corrugated form creates a series of vertical channels 39a with outermost vertical channel edges 39b forming an air-tight seal between the vertical channel array and the outside environment. Similarly, rotating the corrugated form 90 degrees creates a series of horizontal channels 49a with outermost horizontal channel edges 49b forming an air-tight seal between the vertical channel array and the outside environment.

Figure 5:
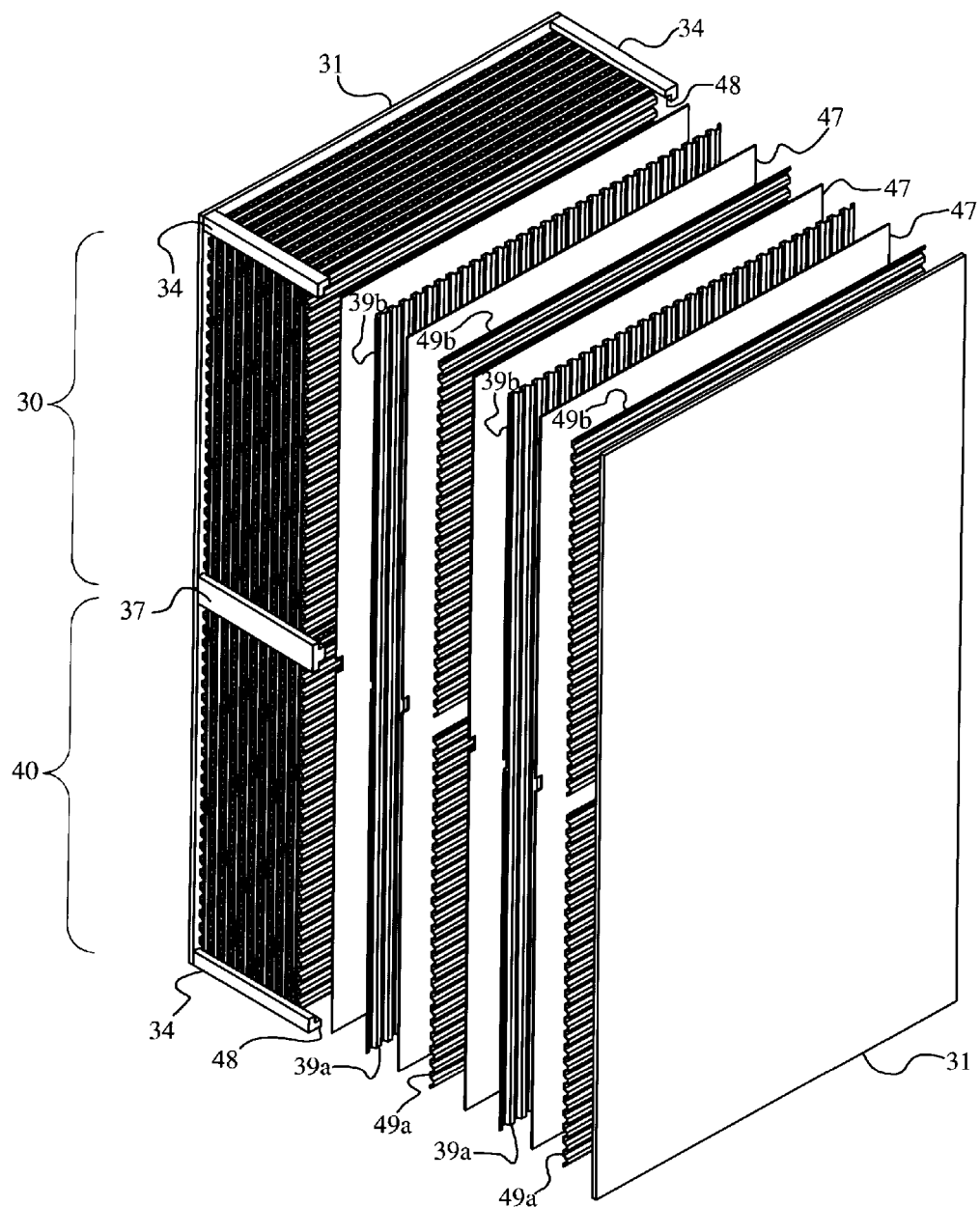
FIG. 5 is a detailed exploded view of a precooler/reheater and evaporator heat exchanger unit of the present disclosure.

FIG. 5 is an exploded view of the construction of the single unit construction comprising precooler/reheater heat exchanger chamber 30 and evaporator heat exchanger chamber 40. Each individual sheet of an array is composed of a corrugated member affixed to a flat panel to form either a vertical subunit or horizontal subunit. During assembly, flat panel 47 is interleafed with alternating vertical corrugated sheets and horizontal corrugated sheets. Outer plates 31 encase and seal the assembly of aluminum sheets as the layers of vertical and horizontal corrugated forms and isolation barrier sheets are retained by corner supports 34. Corner supports 34 and mid supports 37 have notched recesses 48. Notch recesses 48 receive the interleafed vertical and horizontal channel arrays and flat panels 47 during assembly. The entire assembly is conventionally fused together by any number of processes, for example dipped and brazed, soldered, sonic weld, ultrasonic weld, microwave bonding, fusion bonding, etc. The preferred method of sealing/fusing the present disclosure is a braze bonding process using an appropriate alloy to fuse an approximate 0.0156 inch thick aluminum material for the channeled aluminum sheets, and a 0.03125 inch thick aluminum material for the flat isolation barriers. In like manner, outer panels 314 are made of an approximate 0.125 inch thick (or thicker) aluminum material which are braze bonded to the inner channels and barriers with the corner supports 34. The resulting structure can withstand several hundred degrees of temperature and several thousand pounds per square inch shear pressure. Further, all heat exchangers described in this disclosure are preferably bonded via brazing methods. It is important to understand that the corrugated aluminum heat exchanger described herein is most suitable in a compressed air/gas environment. In the preferred embodiment of the present disclosure the two sides of the exchanger are configured to withstand the pressures and temperatures typically found in such environments.

Although described above using a corrugated assembly the single unit construction comprising precooler/reheater heat exchanger chamber 30 and evaporator heat exchanger chamber 40 may also be constructed as 'tube and shell' or 'braised plate' heat exchangers which are known in the art. Such conventional heat exchangers fill the allocated chamber spaces 30 and 40, and function as a precooler/reheater and evaporator, respectively, when air and/or refrigerant are introduced.

FIG. 6 is a flow schematic showing the paths and flow patterns through monolithically constructed compressed air/gas dryer system 10. For the sake of clarity, airflow is depicted by solid black line arrows and all refrigerant flow is depicted by framed in white arrows. The side plainer view illustrates an embodiment having four horizontal chambers 20, 30, 40, and 50 in a single row and vertical filter column 60. Contaminated, hot, wet air enters inlet chamber 20 in the general direction shown by arrow 200 through air inlet 22. The contaminated, hot, wet air then passes through the vertical precooler channel array of precooler/reheater heat exchanger chamber 30 in the general direction shown by arrow 210 where it is cooled by air passing though the horizontal reheater channel array. The precooled air exits precooler/reheater heat exchanger chamber 30 in the general direction shown by arrow 215. Heat exchange occurs when the relatively warmer air from inlet chamber 20 passing within precooler/reheater heat exchanger chamber 30 warms the relatively cooler air coming from vertical filter column 60; and the relatively cooler air coming from vertical filter column 60 cools the relatively warmer air coming from the inlet chamber.

Precooled air from precooler/reheater heat exchanger chamber 30 then continues through evaporator heat exchanger chamber 40 in the general direction shown by arrow 220 where it is rapidly cooled to about 34° F. Cooling air to slightly above freezing (32° F.) causes moisture within the air to condense and fall into sump module 50. The air is rapidly cooled by action of a refrigerant circulating within the horizontal arrays of evaporator heat exchanger chamber 40. The cold, dry air then exits evaporator heat exchanger chamber 40 into sump chamber 50 in the general direction shown by arrow 225. Condensate 71 collected in sump chamber 50 is removed from the system by opening sump area drain port 52 in the general direction shown by arrow 70.

The cold, dry air passes from evaporator heat exchanger chamber 40 and through sump chamber 50 in the general direction shown by arrow 230. The cold, dry air then passes into vertical filter column 60 in the general direction shown by arrow 231 and continues up into coalescing filter 62 where any particulates in the air are filtered-out and any remaining water molecules coalesce. The coalesced water is drained out filter port 66 as condensate 76 in the general direction shown by arrow 75. The clean, dry, filtered, cold air now passes through pass-through hole 38 in the general direction shown by arrow 245 into precooler/reheater before cavity 35. Precooler/reheater before cavity 35 serves to equally deliver air to the approach side of the horizontal reheater channel array of the precooler/reheater in the general direction shown by arrow 250. The filtered, dry, warm air leaves the reheater and enters into precooler/reheater after cavity 33 in the general direction shown by arrow 260, The air is then allowed to exit through air outlet port 32 as dry, clean, filtered air in the general direction shown by arrow 300.

A second looped circuit is the refrigerant/coolant circuit. The refrigerant/coolant circuit comprises refrigerant/coolant inlet port 42, evaporator before cavity 45, the horizontal array within evaporator heat exchanger chamber 40, evaporator after cavity 43, and refrigerant/coolant outlet port 44. In use, evaporator before cavity 45 is charged with refrigerant through the refrigerant/coolant inlet port 42 (as shown in FIG. 1). Refrigerant/coolant passes from evaporator before cavity 45 through evaporator heat exchanger chamber 40 in the general direction shown by arrow 410. The charged refrigerant/coolant in the horizontal array of evaporator heat exchanger chamber 40 cools the precooled air passing through the vertical array of evaporator heat exchanger chamber 40. The spent refrigerant/coolant then passes into evaporator after cavity 43 in the general direction shown by arrow 420 before exiting the system via refrigerant/coolant outlet port 44 in the general direction of arrow 430.

Although the disclosure has been described with reference to certain preferred embodiments, it will be appreciated by those skilled in the art that modifications and variations may be made without departing from the spirit and scope of the disclosure. Particularly, it should be noted that the above preferred embodiment depicts typically a 1000 standard cubic feet per minute (scfm) dryer system capacity. To achieve a smaller or larger capacity dryer system (for example 500 scfm or 1200 scfm), a simple change in the air inlet port 22 and air outlet port 32 sizing would make such dryer system modifications. Still further, again by example, a smaller or larger capacity can be achieved by altering the 'height' and 'width' of precooler/reheater heat exchanger chamber 30 and evaporator heat exchanger chamber 40 (along with other adjoining subcomponents adjusted in size to accommodate the modifications). The height and/or width change would either extend or shorten the contact time the air or refrigerant has with various surfaces within the heat exchangers, thus modifying the capacity to suit any desired scfm. It should be understood that applicant does not intend to be limited to the particular details described above.

We claim:

1. A monolithic compressed-gas dryer device comprising:
   a flow through gas device, including in series,
   a) an gas inlet chamber for introducing incoming gas into said device;
   b) a precooler/reheater chamber for housing a gas-to-gas heat exchanger;
   c) an evaporator chamber for housing a refrigerant-to-gas heat exchanger;
   d) a sump chamber fluidly connected to the evaporator chamber for collecting and draining condensate from the evaporator chamber in said device, the sump chamber including a first drain port;
   e) wherein said chambers are welded together to form a plurality of columns for creating gas flow through passages where at least one of said columns has a filtration chamber for housing a filter, the filtration chamber having a second drain port, separate from the first drain port;
   f) a gas outlet for discharging outgoing gas;
   g) a first set of heat transfer passages extending through said heat exchangers in which incoming gas can pass serially through said heat exchangers in a first direction;
   h) a second set of heat transfer passages extending through said evaporator chamber in heat exchange relationship with said first set of heat transfer passages through which a charge of refrigerant can pass in a heat exchange relationship with said incoming gas and in a direction substantially perpendicular to said first direction of said incoming gas to produce chilled gas;
   i) a filtration passage within said filtration chamber for conducting chilled gas through said filter from said first set of heat transfer passages to a third set of heat transfer passages;
   j) said third set of heat transfer passages extending through said precooler/reheater chamber in heat exchange relationship with said first set of heat transfer passages and through which chilled gas can pass in heat exchange relationship with incoming gas and in a direction substantially perpendicular to said first direction of incoming gas;
   wherein incoming gas can be chilled in said evaporator chamber and chilled gas therefrom can exchange heat with incoming gas in said precooler/reheater chamber to precool incoming gas and to raise the temperature of chilled gas to a temperature for ultimate use upon discharge.

2. The monolithic compressed-gas dryer device of claim 1 wherein said filtration chamber houses a replaceable coalescing filter element.

3. The monolithic compressed-gas dryer device of claim 2 wherein said filtration chamber has an access hole and removable filter access cap with a sealing means for access to said replaceable filter.

4. The monolithic compressed-gas dryer device of claim 3 wherein said sealing means is a series of male threads on said filter access cap which correspond with a series of female threads within said access hole.

5. The monolithic compressed-gas dryer device of claim 3 wherein said sealing means is an o-ring seal and a flange cover secured by bolts.

6. The monolithic compressed-gas dryer device of claim 2 wherein said filter is a coalescing filter.

7. The monolithic compressed-gas dryer device of claim 1 wherein said heat exchangers are constructed as corrugated sheet units having vertical channels and horizontal channels.

8. The monolithic compressed-gas dryer device of claim 7 wherein said precooler/reheater chamber has a cavity before and after said horizontal channels of said gas-to-gas heat exchanger to allow for equal distribution of gas within said horizontal channels; and wherein said evaporator chamber for housing a refrigerant-to-gas heat exchanger has a cavity before and after said horizontal channels of said refrigerant-to-gas heat exchanger to allow for equal distribution of refrigerant within said horizontal channels.

9. The monolithic compressed-gas dryer device of claim 1 further comprising a sensor port for insertion of a level sensor and a dew point port for insertion of a dew point sensor.

10. A monolithic compressed-gas dryer device comprising:
a flow through gas device, including in series,
a) an inlet chamber for introducing incoming gas into said device;
b) at least one precooler/reheater chamber for housing a gas-to-gas heat exchanger;
c) at least one evaporator chamber for housing a refrigerant-to-gas heat exchanger;
d) a sump chamber fluidly connected to the evaporator chamber for collecting and draining condensate from the evaporator chamber in said device, the sump chamber including a first drain port;
e) wherein said chambers are welded together to form a plurality of columns for creating gas flow through passages where at least two of said columns have a filtration chamber for housing a filter, the filtration chamber having a second drain port, separate from the first drain port;
f) a gas outlet for discharging outgoing gas;
g) a first set of heat transfer passages extending through said heat exchangers in which incoming gas can pass serially through said heat exchangers in a first direction;
h) a second set of heat transfer passages extending through said evaporator chamber in heat exchange relationship with said first set of heat transfer passages through which a charge of refrigerant can pass in a heat exchange relationship with incoming gas and in a direction substantially perpendicular to said first direction of incoming gas to produce chilled gas;
i) a third set of heat transfer passages extending through said precooler/reheater chamber in heat exchange relationship with said first set of heat transfer passages and through which chilled gas can pass in heat exchange relationship with incoming gas and in a direction substantially perpendicular to said first direction of incoming gas;
j) at least one filtration passage within said at least two of said columns having a filtration chamber for conducting gas from any one of said chambers to one of said heat transfer passages;

wherein incoming gas can be chilled in said evaporator chamber and chilled gas therefrom can exchange heat with incoming gas in said precooler/reheater chamber to precool incoming gas and to raise the temperature of chilled gas to a temperature for ultimate use upon discharge.

11. The monolithic compressed-gas dryer device of claim 10 wherein said filtration chamber has an access hole and removable filter access cap with a sealing means for access to said replaceable filter.

12. The monolithic compressed-gas dryer device of claim 11 wherein said sealing means is a series of male threads on said filter access cap which correspond with a series of female threads within said access hole.

13. The monolithic compressed-gas dryer device of claim 11 wherein said sealing means is an o-ring seal and a flange cover secured by bolts.

14. The monolithic compressed-gas dryer device of claim 10 wherein said heat exchangers are constructed as corrugated sheet units having vertical channels and horizontal channels for directing gas and refrigerant.

15. The monolithic compressed-gas dryer device of claim 14 wherein said precooler/reheater chamber has a cavity before and after said horizontal channels of said gas-to-gas heat exchanger to allow for equal distribution of gas within said horizontal channels; and wherein said evaporator chamber for housing a refrigerant-to-gas heat exchanger has a cavity before and after said horizontal channels of said refrigerant-to-gas heat exchanger to allow for equal distribution of refrigerant within said horizontal channels.

16. The monolithic compressed-gas dryer device of claim 10 wherein said replaceable filter is a particulate/coalescing filter.

17. The monolithic compressed-gas dryer device of claim 10 wherein said replaceable filter is a coalescing filter.

18. The monolithic compressed-gas dryer device of claim 10 further comprising a sensor port for insertion of a level sensor and a dew point port for insertion of a dew point sensor.

19. A method of constructing the monolithic compressed-gas dryer device of claim 15 wherein said cavities before and after said horizontal channels of said refrigerant-to-gas heat exchanger are welded onto said evaporator chamber and said cavities and said chamber are pressure tested to ensure a pressure tight seal prior to welding said inlet chamber, said at least one precooler/reheater chamber and said sump chamber.

20. A monolithic compressed-gas dryer device comprising:
a flow through gas device, including in series,
a) an gas inlet chamber for introducing incoming gas into said device;
b) a precooler/reheater chamber for housing a gas-to-gas heat exchanger;
c) an evaporator chamber for housing a refrigerant-to-gas heat exchanger;
d) a sump chamber fluidly connected to the evaporator chamber for collecting and draining condensate from the evaporator chamber in said device;
e) wherein said chambers are welded together to form a plurality of columns for creating gas flow through passages where at least one of said columns has a filtration chamber for housing a filter, wherein said sump chamber is fluidly connected between the evaporator chamber and the filtration chamber;
f) a gas outlet for discharging outgoing gas;
g) a first set of heat transfer passages extending through said heat exchangers in which incoming gas can pass serially through said heat exchangers in a first direction;

h) a second set of heat transfer passages extending through said evaporator chamber in heat exchange relationship with said first set of heat transfer passages through which a charge of refrigerant can pass in a heat exchange relationship with incoming gas and in a direction substantially perpendicular to said first direction of incoming gas to produce chilled gas which then can pass to the sump chamber;

i) a filtration passage within said filtration chamber for conducting chilled gas from the sump chamber through said filter from said first set of heat transfer passages to a third set of heat transfer passages;

j) said third set of heat transfer passages extending through said precooler/reheater chamber in heat exchange relationship with said first set of heat transfer passages and through which chilled gas can pass in heat exchange relationship with incoming gas and in a direction substantially perpendicular to said first direction of incoming gas;

wherein incoming gas is chilled in said evaporator chamber and chilled gas therefrom exchanges heat with incoming gas in said precooler/reheater chamber to precool incoming gas and to raise the temperature of chilled gas to a temperature for ultimate use upon discharge.

21. The monolithic compressed gas dryer device of claim 20, wherein said filtration chamber is vertically disposed adjacent to the evaporator chamber and the precooler/reheater chamber.

22. The monolithic compressed gas dryer device of claim 21, wherein the precooler/reheater chamber is vertically disposed adjacent to and above the evaporator chamber.

23. The monolithic compressed gas dryer device of claim 21, wherein the filtration chamber includes a lower end fluidly connected to the sump chamber.

24. The monolithic compressed gas dryer device of claim 23, wherein a replaceable coalescing and particulate filter element is disposed within the filtration chamber, and the chamber includes a removable cap in an upper end of the chamber for accessing the filter element.

25. A monolithic compressed-gas dryer device comprising:
a flow through gas device, including in series,
a) an inlet chamber for introducing incoming gas into said device;
b) at least one precooler/reheater chamber for housing a gas-to-gas heat exchanger;
c) at least one evaporator chamber for housing a refrigerant-to-gas heat exchanger;
d) a sump chamber fluidly connected to the evaporator chamber for collecting and draining condensate from the evaporator chamber in said device;
e) wherein said chambers are welded together to form a plurality of columns for creating gas flow through passages where at least two of said columns have a filtration chamber for housing a filter, wherein said sump chamber is fluidly connected between the evaporator chamber and the filtration chamber;
f) a gas outlet for discharging outgoing gas;
g) a first set of heat transfer passages extending through said heat exchangers in which incoming gas can pass serially through said heat exchangers in a first direction;
h) a second set of heat transfer passages extending through said evaporator chamber in heat exchange relationship with said first set of heat transfer passages through which a charge of refrigerant can pass in a heat exchange relationship with incoming gas and in a direction substantially perpendicular to said first direction of incoming gas to produce chilled gas which then can pass to the sump chamber;
i) a third set of heat transfer passages extending through said precooler/reheater chamber in heat exchange relationship with said first set of heat transfer passages and through which chilled gas can pass in heat exchange relationship with incoming gas and in a direction substantially perpendicular to said first direction of incoming gas;
j) at least one filtration passage within said at least two of said columns having a filtration chamber for conducting gas from the sump chamber to one of said heat transfer passages;

wherein incoming gas can be chilled in said evaporator chamber and chilled gas therefrom can exchange heat with incoming gas in said precooler/reheater chamber to precool incoming gas and to raise the temperature of chilled gas to a temperature for ultimate use upon discharge.

26. The monolithic compressed gas dryer device of claim 25, wherein said filtration chamber is vertically disposed adjacent to the evaporator chamber and the precooler/reheater chamber.

27. The monolithic compressed gas dryer device of claim 26, wherein the precooler/reheater chamber is vertically disposed adjacent to and above the evaporator chamber.

28. The monolithic compressed gas dryer device of claim 26, wherein the filtration chamber includes a lower end fluidly connected to the sump chamber.

29. The monolithic compressed gas dryer device of claim 28, wherein a replaceable coalescing and particulate filter element is disposed within the filtration chamber, and the chamber includes a removable cap in an upper end of the chamber for accessing the filter element.

* * * * *